United States Patent [19]

Eguchi

[11] Patent Number: 4,847,828
[45] Date of Patent: Jul. 11, 1989

[54] ANALOG DATA SIGNAL SWITCHING NETWORK WITH MEANS FOR CROSS-CONNECTING ANALOG SIGNALS TO OUTPUT LINES BY DOUBLE-STAGE SAMPLING

[75] Inventor: Mikiro Eguchi, Tokyo, Japan

[73] Assignee: NEC Corporation, Japan

[21] Appl. No.: 231,074

[22] Filed: Aug. 11, 1988

[30] Foreign Application Priority Data

Aug. 12, 1987 [JP] Japan ................................ 62-200026

[51] Int. Cl.$^4$ ........................................... H04Q 11/04
[52] U.S. Cl. .................................................. 370/58
[58] Field of Search ...................... 370/58, 62, 112, 57, 370/123, 72, 76, 113, 53; 328/104, 105, 151; 307/242, 243; 340/870.18, 870.15

[56] References Cited

U.S. PATENT DOCUMENTS 4,313,195 1/1982 Lehmann ............................ 370/113
4,761,779 8/1988 Nara et al. ............................ 370/58

Primary Examiner—Robert L. Griffin
Assistant Examiner—Frank M. Scutch, III
Attorney, Agent, or Firm—Laff, Whitesel, Conte & Saret

[57] ABSTRACT

In a switching network for switchingly and selectively deliver a particular one of a plurality of input channel signals to a specific one of a plurality of ouptut channel lines according to a channel selection signal, the input channel signals are sampled at input channel sample-and-hold circuits by input channel sampling signals to produce sampled signals which are arranged time-serially at a combining circuit to form a combined signal. The combined signal is sampled at output channel sample-and-hold circuits connected to the output channel lines, respectively. An extracting signal is synchronous with a particular one of the input channel sampling signals and is applied to a specific one of the output channel sample-and-hold circuits according to the channel selection signal. The specific sample-and-hold circuit samples the combined signal by the extracting signal and extracts a particular one of the sampled signals corresponding to the particular input channel signal. The particular sampled signal as extracted is passed through a lowpass filter so that the particular input channel signal is reproduced. The reproduced particular input channel signal is delivered to the specific output channel.

4 Claims, 5 Drawing Sheets

ANALOG DATA SIGNAL SWITCHING NETWORK WITH MEANS FOR CROSS-CONNECTING ANALOG SIGNALS TO OUTPUT LINES BY DOUBLE-STAGE SAMPLING

BACKGROUND OF THE INVENTION (1) Field of the Invention

The present invention relates to an analog data signal switching network for cross-connecting analog data signals from a plurality of data transmitters to desired ones of a plurality of transmission lines.

(2) Description of the Prior Art

In an analog data transmission system where digital data signals are converted into analog data signals which are, in turn, transmitted to desired analog transmission lines, a switching network is used for cross-connecting or selectively connecting each one of a plurality of analog data signals as input channel signals from a plurality of data transmitters to a desired one of a plurality of output channel transmission lines according to a channel selection signal applied to the switching network. The channel selection signal is a signal for instructing to deliver a particular one of the input channel signals to a specific one of output channel transmission lines.

The switching network can contain a stand-by transmission line and a stand-by data transmitter. When a fault occurs in one of the data transmitters or one of the output channel transmission lines, the switching network can make the stand-by data transmitter or the stand-by transmission line take over the fault transmitter or the fault output channel transmission line by changing the channel selection signal.

A known switching network is a space switch having many relay contacts for switchingly coupling a particular one of the input channel signals to a specific one of the output channel transmission lines. The relay contacts have a problem in reliability for a long use.

As another known switching network, a time division switching network wherein each of the analog data signals as the input channel signals is converted to a digital signal by an analog-digital (A/D) converter and stored in a memory. The digital data signal is read from the memory to a digital-analog (D/A) converter connected to a desired or specific one of transmission lines. Then, the D/A converter converts the read digital data signal to a reproduced analog data signal and transmits the reproduced analog data signal to the specific output channel transmission line.

The time division switching network is small in size and good in reliability for a long use. However, use of A/D and D/A converters makes the switching network expensive. Further, the reproduced analog signal suffers from quantized noise generated in A/D conversion.

SUMMARY OF THE INVENTION

Accordingly, it is an object of the present invention to provide a switching network for cross-connecting a plurality of analog data signals from data transmitters to a plurality of transmission lines which is excellent in reliability for a long use, and is economical without use of A/D and D/A converters, and makes the analog data signals free from the quantized noise.

As described above, a switching network is used in an analog data transmission system comprising first through n-th data transmitter means for generating first through n-th analog data signals as first through n-th input channel signals, respectively, and first through m-th output channel transmission lines, so as to switchingly connect a particular one of the first through n-th input channel signals to a specific one of the first through m-th output channel transmission lines according to a channel selection signal. According to the present invention, the switching network comprises: first through n-th input terminals connected to the data transmitter means for receiving the first through n-th channel signals, respectively; first through m-th output terminals for connecting the first through m-th output channel transmission lines, respectively; sampling signal generating means for generating first through n-th input channel sampling signals, the first through n-th input channel sampling signals having a predetermined frequency (f) but being out of phase by $1/(n \times f)$ from one another; first through n-th input channel sample-and-hold means coupled with the first through n-th input terminals and responsive to the first through n-th input channel sampling signals for sampling the first through n-th input channel signals to produce a plurality of first through n-th sampled signals, respectively; combining means coupled with the first through n-th input channel sample-and-hold means for combining the first through n-th sampled signals to produce a combined signal having the first through n-th sampled signals time-serially arranged; first through m-th output channel extracting means coupled with the combining means, each of the first through m-th extracting means responsive to an extracting signal for extracting one of the first through n-th sampled signals from the combined signal to reproduce one of the first through n-th input channel signals, the reproduced input channel signal being delivered to a corresponding one of the first through m-th output terminals; and extracting signal supplying means for generating a plurality of delayed signals synchronized with, but having a predetermined delayed time from, the first through n-th input channel sampling signals, respectively, the extracting signal supplying means delivering a particular one of the delayed signals corresponding to the particular input channel as the extracting signal to a specific one of the first through m-th output channel extracting means corresponding to the specific output channel according to the channel selection signal, so that the particular input channel signal is reproduced by the specific output channel extracting means and delivered to the specific output channel transmission line.

According to an aspect of the present invention, each one of the first through m-th output channel extracting means comprises a sample-and-hold means for sampling the combined signal by use of the extracting signal as a sampling signal to extract one of the first through n-th sampled signals from the combined signal as an extracted signal having harmonic components, and a filtering means for removing the higher harmonic components from the extracted signal to reproduce one of the first through n-th input channel signals.

DESCRIPTION OF PREFERRED EMBODIMENTS

Figure 1:
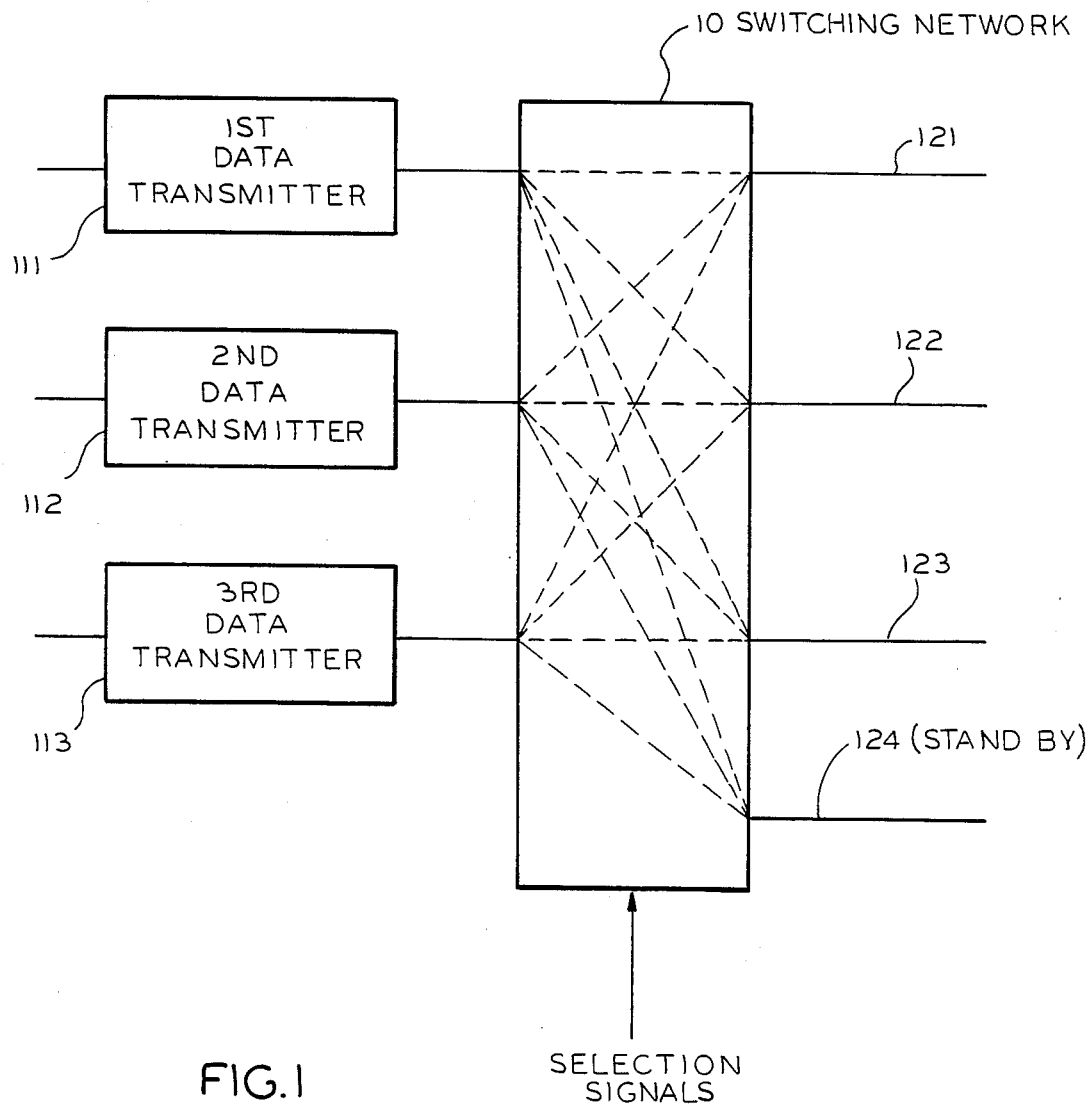
FIG. 1 is a schematic circuit diagram view for illustrating an analog data signal transmission system comprising a switching network.

Referring to FIG. 1, an analog data signal transmission system shown therein comprises a switching network 10, a plurality of first through n-th data transmitters 111 to 11n (illustrating an example of n=3) connected to the switching network 10, and a plurality of first through m-th output channel transmission lines 121 through 12m (illustrating an example of m=4).

In a known system, each of data transmitters 111 through 113 is connected to a data input terminal device (not shown) and converts a digital data signal from the data input terminal device to an analog data signal which is applied to the switching network 10 as an input channel signal.

In another system, each one of the data transmitters 111 through 113 are connected to a plurality of data input terminal devices (not shown). Each of the data transmitters 111 to 113 multiplexes a plurality of digital data signals from the data input terminal devices in the time-division fashion to form a time-division multiplexed digital data signal and converts the time-division multiplexed digital signal to an analog data signal which is, in turn, applied to the switching network 10 as an input channel signal.

Three input channel signals from the three data transmitters 111–113 are delivered or switchingly coupled to desired ones of the three output channel transmission lines 121–123 according to channel selection signals applied to the switching network, respectively. It is assumed that the fourth transmission line 124 is also provided as a stand-by transmission line. When a fault occurs in either one of the three output channel transmission lines 121–123, the selection signals are changed so that one of the three transmitters 111–113 connected to the fault output channel transmission line is switched over to the stand-by transmission line 124 from the fault output channel transmission line while the remaining transmitters being maintained to be connected to the other output channel transmission lines as they were.

Accordingly, the three data transmitters 111–113 can be selectively connected to the four transmission lines 121–124 including the stand-by transmission line 124 through various but limited connecting routes which are illustrated by dotted lines in FIG. 1. The switching network 10 establishes specific ones of the connecting routes according to the channel selection signals applied thereto.

Figure 2:
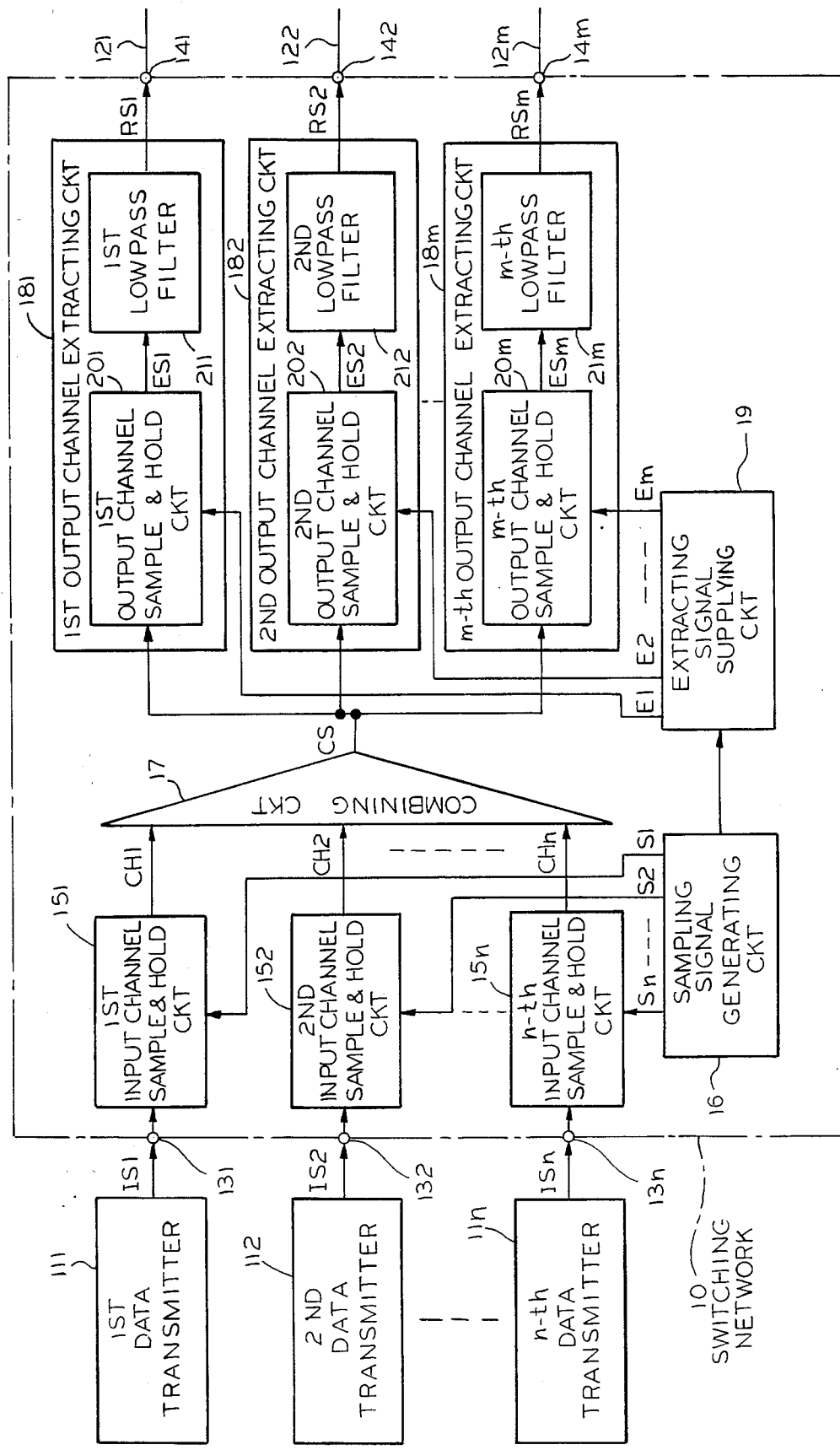
FIG. 2 is a block diagram view of a switching network according to an embodiment of the present invention.

Referring to FIG. 2, the switching network 10 according to an embodiment of the present invention is illustrated to carry out switching connection between first through n-th data transmitters 111 to 11n and first through m-th output channel transmission lines 121 to 12m. The first through n-th data transmitters 111 to 11n are for generating first through n-th analog signals as first through n-th input channel signals IS1, IS2, . . . , and ISn. The switching network comprises first through n-th input terminals 131 to 13n connected to the first through n-th data transmitters 111 to 11n, respectively, and first through m-th output terminals 141 to 14m connected to the first through m-th output channel transmission lines 121 to 12m, respectively. The first through n-th input channel sample-and-hold circuits 151 to 15n are connected to first through n-th input terminals 131 to 13n, respectively. The first through n-th input channel sample-and-hold circuits 151 to 15n are for sampling the first through n-th input channel signals from the data transmitters 111 to 11n by first through n-th input channel sampling signals S1, S2, . . . , and Sn to produce first through n-th sampled signals CH1, CH2, . . . , and CHn, respectively.

A sampling signal generating circuit 16 generates the first through n-th input channel sampling signals S1–Sn which are applied to the first through n-th input channel sample-and-hold circuits 151 to 15n, respectively. The first through n-th input channel sampling signals have a predetermined frequency (f) but are out of phase from each other by $1/(n \times f)$.

The first through n-th sampled signals CH1–CHn are applied to a combining circuit 17 which is for combining the first through n-th sampled signals CH1–CHn to produce a combined signal CS. The combined signal CS comprises first through n-th sampled signals CH1–CHn time-serially arranged and is applied to first through m-th output channel extracting circuits 181 to 18m. Each of the first through m-th extracting circuits 181 to 18m is responsive to one of first through m-th extracting signals E1, E2, . . . , and Em applied thereto for extracting one of the first through n-th sampled signals CH1–CHn from the combined signal applied thereto to reproduce one of the first through n-th input channel signals IS1–ISn. The reproduced input channel signal RS1–RSm is delivered to a corresponding one of the first through m-th output terminals 141 to 14m.

The switching network 10 further comprises an extracting signal supplying circuit 19 for generating a plurality of delayed signals synchronized with, but having a predetermined delayed time from, the first through n-th input channel sampling signals, respectively. The extracting signal supplying circuit 19 delivers a particular one of the delayed signals corresponding to a particular input channel as the extracting signal to a specific one of the first through m-th output channel extracting circuits 181 to 18m corresponding to a specific output channel instructed by the channel selection signal. So that the particular input channel signal is reproduced by the specific output channel extracting circuit of 181 to 18n and is delivered to the specific output channel transmission line of 121 to 12n.

Each one of the first through m-th output channel extracting circuits 181 to 18m can be constituted by a sample-and-hold circuit 201 to 20m for sampling the combined signal CS by use of the extracting signal as a sampling signal to extract one of the first through n-th sampled signals CH1–CHn from the combined signal CS as an extracted signal ES1–Esm having harmonic components, and a lowpass filter of 211 to 21m for removing the higher harmonic components from the extracted signal to reproduce one of the first through n-th input channel signals, according to the known sampling theorem.

The m sample-and-hold circuits 201 to 20m will later be referred to as first through m-th output channel sample-and-hold circuits, respectively, and the m lowpass filters 211 to 21m will later be called first through m-th low pass filters, respectively.

Figure 3:
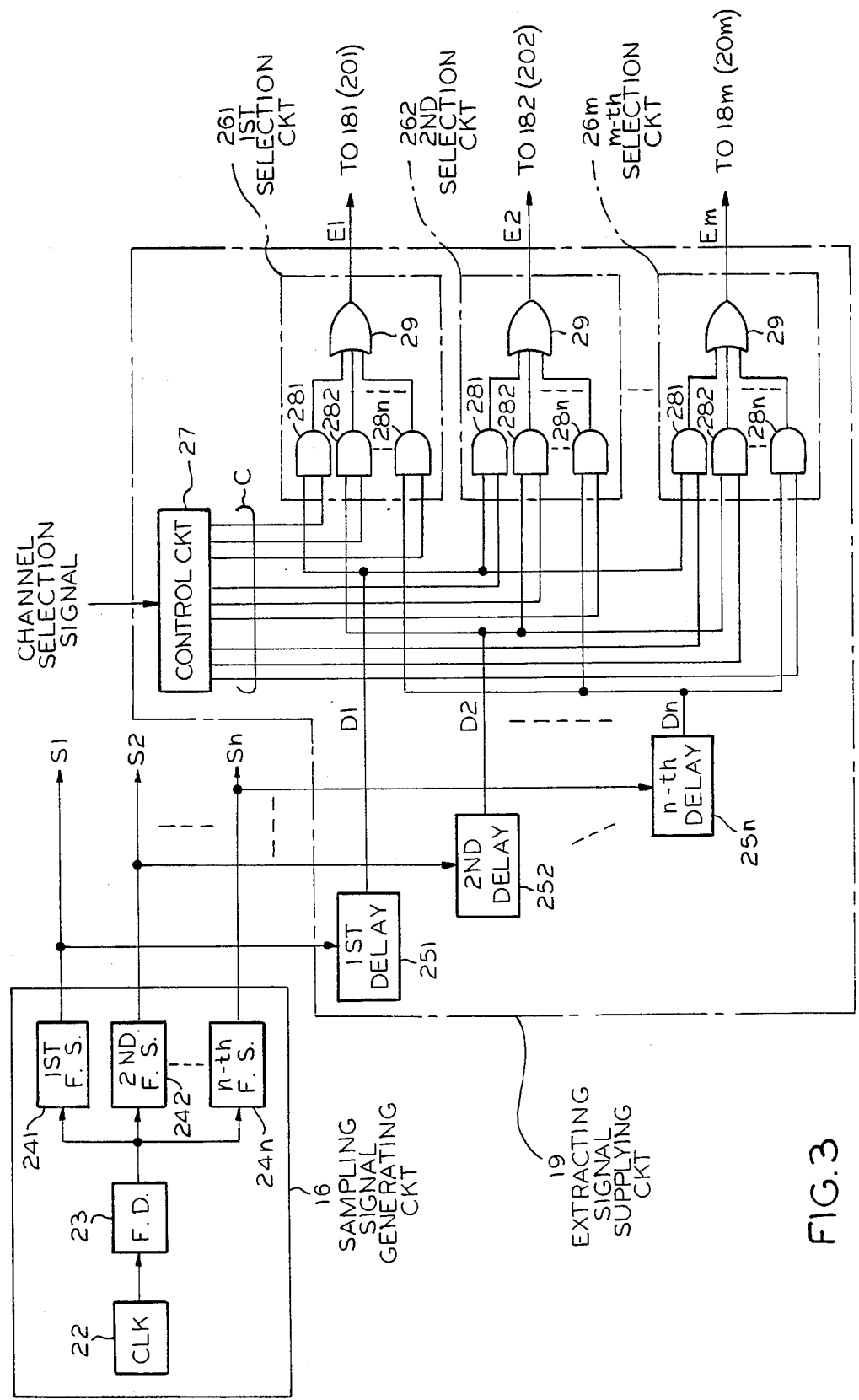
FIG. 3 is a view illustrating an example of a sampling signal generating circuit and an extracting signal generating circuit in FIG. 2.

Referring to FIG. 3, an example of the sampling signal generating circuit 16 and the extracting signal supplying circuit 19 will be described. The sampling signal generating circuit 16 comprises a clock signal generator (CLK) 22 for generating a clock signal having a frequency higher than the sampling signal frequency (f). The clock signal is frequency-divided at a frequency divider (F.D.) 23 so as to produce a divided signal having the frequency (f). The divided signal is applied to first through n-th frequency dividers (F.S.) 241 to 24n and are phase shifted, respectively, so as to produce first through n-th phase shifted signals having phases different from each other by $1/(n \times f)$. The first through n-th phase shifted signals are applied to the first through n-th input channel sample-and-hold circuits 151 to 15n as the first through n-th input channel sampling signals S1-Sn, respectively.

The extracting signal supplying circuit 19 comprises first through n-th delaying circuits (DELAY) 251 to 25n which receive and delay the first through n-th input channel sampling signals IS1-ISn by the predetermined delayed time to produce first through n-th delayed signals D1, D2, . . . , and Dn. The first through n-th delayed signals D1-Dn are commonly applied to each of first through m-th selection circuits 261 to 26m which have outputs coupled with the first through m-th output channel extracting circuits 181 to 18m, respectively. Each of the first through m-th selection circuits 261 to 26m selects one of the first through n-th delayed signals D1-Dn as a selected signal in response to a control signal C applied thereto. The selected signal is applied, as the extracting signal, to a corresponding one of the first through m-th output channel extracting circuit 181 to 18m. The control signal C is generated at a control circuit 27 according to the channel selection signal.

Each of the first through m-th selection circuits 261 to 26m comprises a plurality of (n) AND gates 281 to 28n and an OR gate 29. The first through n-th delayed signals D1-Dn are applied to input terminals of the first through n-th AND gates 281 to 28n, respectively, and the control signal C is selectively applied to another input terminals of the first through n-th AND gates 281 through 28n. Output terminals of the first through n-th AND gates 281 to 28n are commonly connected to the OR gate 29 and an output terminal of the OR gate 29 is connected to a corresponding one of the first through m-th output channel extracting circuits 181 to 18n.

When the channel selection signal indicates, for example, to deliver the first input channel signal IS1 to the first output channel transmission line 121, the control circuit 27 applies the control signal C to the first AND gate 281 of the first selection circuit 261 for selecting the first delayed signal D1. Then, the first delayed signal D1 is selected by the first selection circuit 261 and is applied to the first output channel extraction circuit 181 as the extracting signal.

Now, operation will be described below in connection with a case of n=m=3, with reference to FIGS. 4 and 5 in addition to FIGS. 2 and 3.

Figure 4:
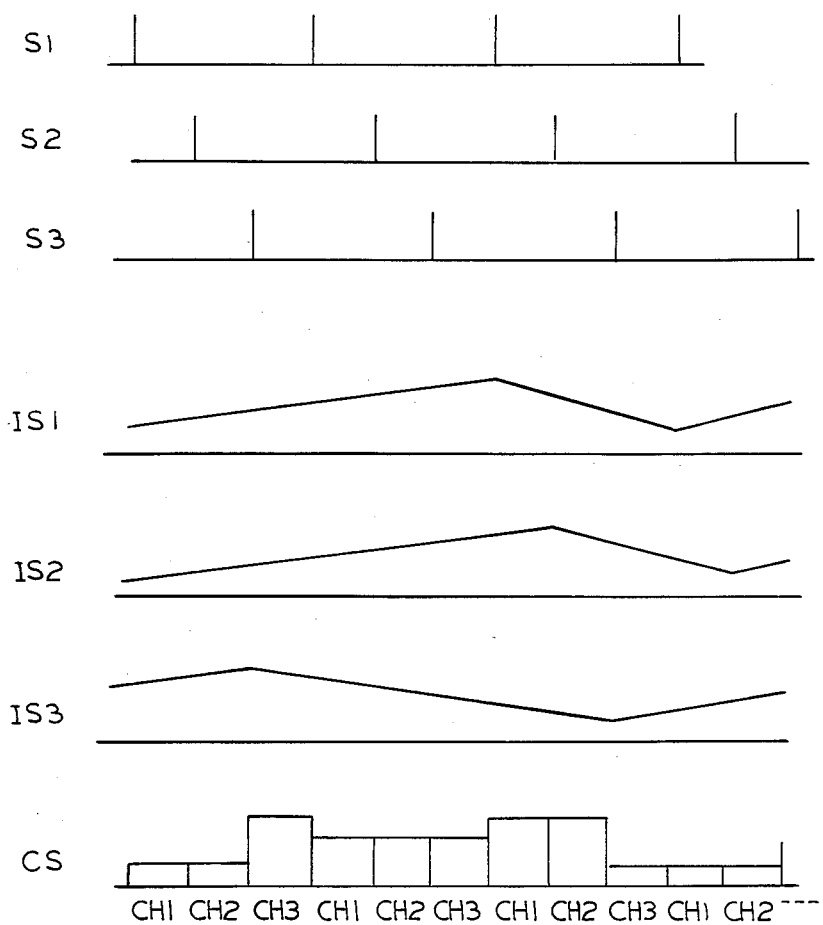
FIG. 4 is a view illustrating waveforms of signals at various portions in the switching network of FIG. 2.

The sampling signal generating circuit 16 generates the first through third input channel sampling signals S1, S2, and S3 which are out of phase from one another as shown in FIG. 4. When first through third transmitters 111 to 11n transmit first through third input channel signals of analog data IS1, IS2, and IS3 as shown in FIG. 4, respectively, the first through third input channel sample-and-hold circuits 151 to 153 sample the first through third input channel signals IS1, IS2, and IS3 by the first through third input channel sampling signals S1, S2, and S3 to produce first through third sampled signals CH1, CH2, and CH3, respectively. The first through third sampled signals CH1, CH2, and CH3 are combined at the combining circuit 17 to form a combined signal CS in which the first through third sampled signals CH1, CH2, and CH3 are time serially arranged in this order as shown in FIG. 4.

The combined signal CS is delivered from the combining circuit 17 to first through third output channel sample-and-hold circuits 201 to 203.

Now, providing that the channel selection signal indicates that the first input channel signal IS1 should be delivered to the second output channel transmission line 122, the control circuit 27 applies the control signal C to first AND gate 281 of the second selection circuit 262. Therefore, the first delayed signal D1 is selected and applied to the second output channel extracting circuit 182 as the extracting signal E2. The first delayed signal D1 is synchronous with the first input channel sampling signal S1 but slightly delayed, as shown in FIG. 5.

Figure 5:
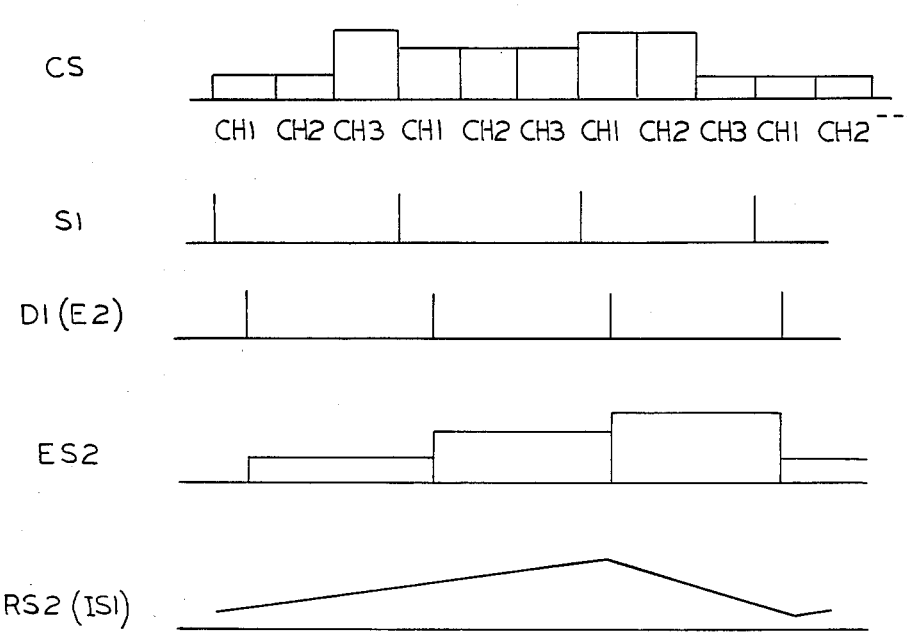
FIG. 5 is a view illustrating waveforms of signals at other various portions in the switching network of FIG. 2.

At the second output channel extracting circuit 182, the second output channel sample-and-hold circuit 202 samples the combined signal CS by the extracting signal E2 (=D1) and extracts the first sampled signal CH1 from the combined signal CS as an extracted signal which is shown at ES2 in FIG. 5, because the extracting signal E2 (=D1) is synchronous with the first input channel sampling signal S1. The extracted signal ES2 is applied to the second lowpass filter 202 so that the first input channel signal IS1 is reproduced as the second reproduced signal which is shown at RS2 in FIG. 5. The second reproduced signal RS2 is transmitted to the second output channel transmission line 122 through the second output terminal 142.

When the second and third input channel signals IS2 and IS3 are instructed to be delivered to the third and first output channel transmission lines 123 and 121, respectively, by the selection signal, the third and first extracting circuits 183 and 181 extract the second and third sampled signals CH2 and CH3 from the combined signal CS and reproduce the second and third input channel signals IS2 and IS3 as the third and the first reproduced signals RS3 and RS1, respectively, in the similar manner as described above. Then, the third and the first reproduced signals RS3 and RS1 are delivered to the third and first output channel transmission lines 123 and 121 through the output terminals 143 and 141, respectively.

Thus, the first, second, and third input signals IS1 to IS3 are delivered to the second, third and first output channel transmission lines 122, 123, and 121, respectively.

Now, it is provided that the switching network 10 further contains the fourth output line, that is m=4. When a fault occurs in the second transmission line 122 during the condition where the first through third input channel signals IS1 to IS3 are delivered to the second, third, and first output lines 112, 123, and 121, respectively, the channel selection signal is changed to instruct the deliver the first input channel signal to not the second output channel transmission line 122 but the fourth output channel transmission line 124. Then, the control signal C is applied to the first AND gate 281 of the fourth selection circuit 264 so that the first delayed signal D1 is applied to the fourth output channel extracting circuit 184 as the fourth extracting signal E4. As a result, the fist sampled signal CH1 is extracted at the fourth extracting circuit 184 and the first input channel signal SS1 is reproduced as the fourth reproduced signal RS4 which is transmitted to the fourth output channel or stand-by transmission line 124.

Thus, the first input channel signals IS1 can be delivered to the stand-by line 124 in place of the fault transmission line 122.

Next, it is assumed that a stand-by data transmitter is connected to the switching network 10 as the fourth data transmitter 114, that is, n=4.

When a fault occurs in the first data transmitter 111 transmitting the first input channel signal IS1 which is delivered to the second output channel transmission line 122, the stand-by data transmitters 114 takes over the first data transmitter 111 and transmits the analog data signal as the fourth channel signal IS4. Then, the channel selection signal is changed to instruct to deliver not the first input channel signal IS1 but the fourth input channel signal IS4 to the second output channel transmission line 124. As a result, the first input channel signal IS1 and the first sampled signal CH1 becomes zero (0) while the fourth input channel signal IS4 and the fourth sampled signal CH4 have a significant level. While, application of the control signal C is changed from the first AND gate 281 to the fourth AND gate 284 in the second selection circuit 262 so that the fourth delayed signal D4 is applied to the second output channel extracting circuit 182 as the second extracting signal E2. Accordingly, the fourth sampled signal CH4 is extracted and the fourth input channel signal IS4 is reproduced as the second reproduced signal RS2 which is transmitted to the second output channel transmission line 122.

What is claimed is:

1. In a switching network for use in an analog data transmission system comprising first through n-th data transmitter means for generating first through n-th analog data signals as first through n-th input channel signals, respectively, and first through m-th output channel transmission lines, the switching network switchingly connecting a particular one of said first through n-th input channel signals to a specific one of said first through m-th output channel transmission lines according to a channel selection signal, the improvement which comprises:

first through n-th input terminals connected to said data transmitter means for receiving said first through n-th channel signals, respectively;

first through m-th output terminals for connecting said first through m-th output channel transmission lines, respectively;

sampling signal generating means for generating first through n-th input channel sampling signals, said first through n-th input channel sampling signals having a predetermined frequency (f) but being out of phase by $1/(n \times f)$ from one another;

first through n-th input channel sample-and-hold means coupled with said first through n-th input terminals and responsive to said first through n-th input channel sampling signals for sampling said first through n-th input channel signals to produce a plurality of first through n-th sampled signals, respectively;

combining means coupled with said first through n-th input channel sample-and-hold means for combining said first through n-th sampled signals to produce a combined signal having said first through n-th sampled signals time-serially arranged;

first through m-th output channel extracting means coupled with said combining means, each of said first through m-th extracting means responsive to an extracting signal for extracting one of said first through n-th sampled signals from said combined signal to reproduce one of said first through n-th input channel signals, said reproduced input channel signal being delivered to a corresponding one of said first through m-th output terminals; and extracting signal supplying means for generating a plurality of delayed signals synchronized with, but having a predetermined delayed time from, said first through n-th input channel sampling signals, respectively, said extracting signal supplying means delivering a particular one of said delayed signals corresponding to said particular input channel as said extracting signal to a specific one of said first through m-th output channel extracting means corresponding to said specific output channel according to said channel selection signal, so that said particular input channel signal is reproduced by said specific output channel extracting means and delivered to said specific output channel transmission line.

2. A switching network as claimed in claim 1, wherein each one of said first through m-th output channel extracting means comprises a sample-and-hold means for sampling said combined signal by use of said extracting signal as a sampling signal to extract one of said first through n-th sampled signals from said combined signal as an extracted signal having harmonic components, and a filtering means for removing said higher harmonic components from said extracted signal to reproduce one of said first through n-th input channel signals.

3. A switching network as claimed in claim 1, wherein said sampling signal generating means comprises a clock signal generating means for generating a clock signal having a frequency higher than said predetermined frequency, frequency divider means coupled with said clock signal generating means for frequency dividing said clock signal to produce a divided signal having said predetermined frequency (f), and phase shifting means coupled to said frequency divider means responsive to said divided signal for phase shifting said divided signal to produce first through n-th phase shifted signals having phases different from each other by $1/(n \times f)$ as said first through n-th input channel sampling signals, respectively.

4. A switching network as claimed in claim 1, wherein said extracting signal supplying means comprises:

first through n-th delaying means coupled with said sampling signal generating means for delaying said first through n-th input channel sampling signals by said predetermined delayed time to produce first through n-th delayed signals;

first through m-th selection means having outputs coupled with said first through m-th output channel extracting means, respectively, each of said first through m-th selection means coupled with said first through n-th delaying means responsive to a control signal for selecting one of said first through n-th delayed signals as a selected signal to deliver said selected signal as said extracting signal to a corresponding one of said first through m-th output channel extracting means; and control means responsive to said channel selection signal for generating said control signal and delivering said control signal to a specific one of said first through m-th selection means coupled to said specific output channel extracting means.

* * * * *